US010673699B2

(12) United States Patent
Wittberg et al.

(10) Patent No.: US 10,673,699 B2
(45) Date of Patent: Jun. 2, 2020

(54) METHODS AND APPARATUS IN A WIRELESS COMMUNICATIONS NETWORK

(71) Applicant: Telefonaktiebolaget LM Ericsson (publ), Stockholm (SE)

(72) Inventors: Mikael Wittberg, Uppsala (SE); Torsten Dudda, Aachen (DE); Qianxi Lu, Beijing (CN); Zhan Zhang, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 154 days.

(21) Appl. No.: 15/579,981

(22) PCT Filed: Oct. 19, 2017

(86) PCT No.: PCT/SE2017/051029
§ 371 (c)(1),
(2) Date: Dec. 6, 2017

(87) PCT Pub. No.: WO2018/128565
PCT Pub. Date: Jul. 12, 2018

(65) Prior Publication Data
US 2019/0222474 A1 Jul. 18, 2019

(30) Foreign Application Priority Data

Jan. 6, 2017 (WO) ................ PCT/CN2017/070442

(51) Int. Cl.
*H04L 12/24* (2006.01)
*H04L 1/08* (2006.01)
(Continued)

(52) U.S. Cl.
CPC .............. *H04L 41/084* (2013.01); *H04L 1/08* (2013.01); *H04W 16/28* (2013.01);
(Continued)

(58) Field of Classification Search
CPC ........ H04L 41/084; H04L 1/08; H04W 16/28; H04W 72/0453; H04W 72/046
See application file for complete search history.

(56) References Cited

U.S. PATENT DOCUMENTS

2012/0057560 A1 3/2012 Park et al.
2017/0201603 A1* 7/2017 Uchino ................. H04W 36/02
(Continued)

FOREIGN PATENT DOCUMENTS

WO 2016146347 A1 9/2016
WO 2016159845 A1 10/2016

OTHER PUBLICATIONS

3GPP, "3rd Generation Partnership Project; Technical Specification Group Radio Access Network; Study on New Radio Access Technology; Radio Interface Protocol Aspects (Release 14)", 3GPP TR 38.804 V0.4.0, Nov. 2016, 1-30.
(Continued)

*Primary Examiner* — Shukri Taha
(74) *Attorney, Agent, or Firm* — Murphy, Bilak & Homiller, PLLC

(57) ABSTRACT

There is provided a method in a user equipment for a wireless communications network, comprising: receiving a configuration message from a base station for the wireless communications network, the configuration message indicating that data to be transmitted between the user equipment and the wireless communications network is to be duplicated; and responsive to receipt of the configuration message, transmitting a first data unit and a second data unit to the wireless communications network, or receiving a first data unit and a second data unit from the wireless communications network; wherein the second data unit is a duplicate of the first data unit, and wherein the first data unit is transmitted or received using first radio resources, and the second data unit is transmitted using second radio resources that are different than the first radio resources.

26 Claims, 8 Drawing Sheets

(51) Int. Cl.
    *H04W 16/28*     (2009.01)
    *H04W 72/04*     (2009.01)
    *H04W 80/02*     (2009.01)
    *H04W 88/02*     (2009.01)
    *H04W 88/10*     (2009.01)

(52) U.S. Cl.
    CPC ..... *H04W 72/046* (2013.01); *H04W 72/0453* (2013.01); *H04W 80/02* (2013.01); *H04W 88/023* (2013.01); *H04W 88/10* (2013.01)

(56) References Cited

U.S. PATENT DOCUMENTS

2018/0132220 A1*   5/2018   Jang ...................... H04W 76/14
2019/0200259 A1*   6/2019   Shim ................... H04W 28/065

OTHER PUBLICATIONS

Unknown, Author, "3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.4.0, Sep. 2017, pp. 1-108.

Unknown, Author, "3rd Generation Partnership Project; Technical Specification Group Radio Access Network; Evolved Universal Terrestrial Radio Access (E-UTRA); Multiplexing and channel coding (Release 14)", 3GPP TS 36.212 V14.0.0, Sep. 2016, pp. 1-148.

Unknown, Author, "3rd Generation Partnership Project; Technical Specification Group Radio Access Network; Study on New Radio Access Technology; Radio Interface Protocol Aspects (Release 14)", 3GPP TR 38.804 V14.0.0, Mar. 2017, pp. 1-57.

* cited by examiner

METHODS AND APPARATUS IN A WIRELESS COMMUNICATIONS NETWORK

TECHNICAL FIELD

Embodiments of the present disclosure relate to methods and apparatus in a wireless communication network, and particularly to methods and apparatus for enabling low-latency communications between two wireless devices, or between a wireless device and the wireless communication network.

BACKGROUND

Efforts are on-going to develop and standardize communications networks and protocols intended to meet the requirements set out for the fifth generation (5G) of wireless systems, as defined by the Next Generation Mobile Networks Alliance. Such networks are expected to support a large number of use cases, with different use cases having widely different requirements in terms of the service provided by the network.

For example, some use cases may involve the remote control of machinery, or surgical instruments. In such cases, it is important that data transmitted between the controller (e.g. a surgeon) and the controlled device (e.g. surgical instruments) is reliable and has low latency. A class of communications requiring such performance has been defined as "ultra-reliable and low-latency communications" (URLLC). See, "Study on New Radio Access Technology; Radio Interface Protocol Aspects" (3GPP TR 38.804, v0.4.0). Note that URLLC traffic is applicable in a wide range of use cases not limited to the surgical/machinery examples set out above.

In current legacy schedulers, in order to ensure a reliable service, data units transmitted by a sender to a receiver over the radio interface are normally followed by an acknowledgement message sent by the receiver to the sender. If a positive acknowledgement message is not received for the transmitted data unit (i.e. the acknowledgement message is negative, or no acknowledgement message is received within a defined time window), then a re-transmission of the data unit may take place. This process is known as automatic repeat request (ARQ).

This scheme or variations of it are used in LTE in the following cases:
  In the Medium Access Control (MAC) protocol, the sender may re-transmit a MAC protocol data unit (PDU), also referred to as a transport block, in case of no successful acknowledgement from the receiver.
  In the Radio Link Control (RLC) protocol, the sender may re-transmit an RLC PDU in case it has received a status report from the receiver indicating negative acknowledgement for the indicated RLC PDU.

In both of these cases, there will be some latency while the sender is waiting for the acknowledgement from the receiver before it can re-transmit the data unit, if necessary, and this will introduce additional latency in the overall end-to-end round-trip-time (RTT).

SUMMARY

Apparatus and methods are disclosed that alleviate some or all of the problems discussed above.

Embodiments of the disclosure relate to duplication of data units transmitted between a sender and a receiver.

In one aspect, the disclosure provides a method in a user equipment for a wireless communications network. The method comprises: receiving a configuration message from a base station for the wireless communications network, the configuration message indicating that data to be transmitted between the user equipment and the wireless communications network is to be duplicated; and, responsive to receipt of the configuration message, transmitting a first data unit and a second data unit to the wireless communications network, or receiving a first data unit and a second data unit from the wireless communications network. The second data unit is a duplicate of the first data unit. The first data unit is transmitted or received using first radio resources, and the second data unit is transmitted using second radio resources that are different than the first radio resources.

In a further aspect, there is provided a method in a first user equipment for a wireless communications network. The method comprises; receiving a configuration message, the configuration message indicating that data to be transmitted between the first user equipment and a second user equipment over a direct communication link is to be duplicated; and, responsive to receipt of the configuration message, transmitting a first data unit and a second data unit to the second user equipment, or receiving a first data unit and a second data unit from the second user equipment. The second data unit is a duplicate of the first data unit. The first data unit is transmitted or received using first radio resources, and the second data unit is transmitted using second radio resources that are different than the first radio resources.

The disclosure further provides a user equipment or apparatus configured to perform these and other methods.

For example, in another aspect the disclosure provides a user equipment for a wireless communications network. The user equipment comprises processing circuitry and a non-transitory computer-readable medium storing instructions which, when executed by the processing circuitry, cause the user equipment to: receive a configuration message from a base station for the wireless communications network, the configuration message indicating that data to be transmitted between the user equipment and the wireless communications network is to be duplicated; and, responsive to receipt of the configuration message, transmit a first data unit and a second data unit to the wireless communications network, or receive a first data unit and a second data unit from the wireless communications network. The second data unit is a duplicate of the first data unit. The first data unit is transmitted or received using first radio resources, and the second data unit is transmitted using second radio resources that are different than the first radio resources.

A further aspect provides a first user equipment for a wireless communications network. The first user equipment comprises processing circuitry and a non-transitory computer-readable medium storing instructions which, when executed by the processing circuitry, cause the first user equipment to: receive a configuration message, the configuration message indicating that data to be transmitted between the first user equipment and a second user equipment over a direct communication link is to be duplicated; and, responsive to receipt of the configuration message, transmit a first data unit and a second data unit to the second user equipment, or receiving a first data unit and a second data unit from the second user equipment. The second data unit is a duplicate of the first data unit. The first data unit is transmitted or received using first radio resources, and the second data unit is transmitted using second radio resources that are different than the first radio resources.

Another aspect of the disclosure provides a method in a base station for a wireless communications network. The method comprises: transmitting a configuration message to a user equipment, the configuration message indicating that data to be transmitted between the user equipment and the wireless communications network is to be duplicated; and transmitting a first data unit and a second data unit to the user equipment, or receiving a first data unit and a second data unit from the user equipment. The second data unit is a duplicate of the first data unit. The first data unit is transmitted or received using first radio resources, and the second data unit is transmitted using second radio resources that are different than the first radio resources.

The disclosure further provides a base station configured to perform these and other methods.

For example, one aspect provides a base station for a wireless communications network. The base station comprises processing circuitry and a non-transitory computer-readable medium storing instructions which, when executed by the processing circuitry, cause the base station to: transmit a configuration message to a user equipment, the configuration message indicating that data to be transmitted between the user equipment and the wireless communications network is to be duplicated; and transmit a first data unit and a second data unit to the user equipment, or receive a first data unit and a second data unit from the user equipment. The second data unit is a duplicate of the first data unit. The first data unit is transmitted or received using first radio resources, and the second data unit is transmitted using second radio resources that are different than the first radio resources.

In any of the embodiments set out above, the first radio resources may comprise a first carrier, while the second radio resources comprise a second carrier (i.e. the first and second data units are transmitted on different carriers).

The first and second data units may be transmitted simultaneously or, alternatively, the second data unit may be transmitted within a time window following transmission of the first data unit.

The first radio resources and second radio resources may comprise different time slots, different transmission frequencies, different orthogonal codes for encoding the data units, different directional beams and/or transmissions to different base stations.

The configuration message may be received over a physical control channel, such as the physical downlink control channel (PDCCH). Additionally or alternatively, the configuration message may comprise an indication of the first and second radio resources. Additionally or alternatively, configuration message may comprise an indication of the transport formats to be used for the transmission of the first and second data units.

The second data unit may be transmitted prior to receipt of any acknowledgement message from the base station in respect of the first data unit.

The first and second data units may be protocol data units, service data units comprised within different protocol data units, or control information.

The first and second data units may relate to ultra-reliable, low-latency communications (URLLC).

In these and other embodiments, duplicated transmission may be supported in one or more of the following methods:

One way to achieve duplicated transmission is for example by using one DCI format for one PDCCH, where the UE is instructed to be aware that duplicated transmissions will happen at a couple of carriers or more carriers so that proper reception of data and corresponding signal processing such as soft-combining or signal selection could be carried out. By such a DCI format and instruction mechanism, a duplicated transmission scheme can be used to achieve the diversity gain whenever necessary.

Another way to achieve duplicated transmission may be to configure certain logical channels to be subject for duplicated transmission. With this method a UE or a network attempts to transmit any MAC SDUs associated with these logical channels in duplicated fashion (multiple times) using different MAC PDUs. The duplicated transmission can be done in different ways, such as:

A duplicated scheduling is requested using a specific DCI format. In this case the MAC SDUs belonging to logical channels configured for duplication will have priority to be sent as duplicated copies in different transport blocks (TBs), but could also for certain cases be considered for one TB; if there is more room in the TB, other MAC SDUs not configured for duplication can also be included and sent either as duplicated SDUs or non-duplicated SDUs.

At a certain TTI, scheduling is ordered for a few MAC PDUs using a number of scheduling grants/assignments (for instance several DCI sent over PDCCH); this set of scheduling requests could be done for one/several MAC PDUs configured in a MIMO multi-data-stream manner, it could be done for several MAC PDUs configured for different carriers (carrier aggregation), or it could be done for different carriers in different MAC instances (such as for dual connectivity). The UE or the network will ensure to transmit duplicated copies of the MAC SDUs that belong to a logical channel configured for duplicated transmissions, and for other MAC SDUs, only one copy of each SDU is transmitted; exactly how many transmitted copies are used and on which channels, can be configured by higher layers.

During a certain small time period, such as a few TTIs, the UE or the network will attempt to transmit duplicated copies of MAC SDUs that belongs to logical channels configured for duplicated transmission. The duplicated transmissions can be done on different carriers (for instance using carrier aggregation or dual connectivity), but it could also be done on the same carrier (but then at different times).

New formats of a DCI or some DCI fields may be introduced to facilitate instructions to UEs about parameters of duplicated transmissions so that the UE as a receiver could be aware of the MAC PDU component structure. The new format of DCI may specify which TB(s)/carrier(s) the duplicated SDU(s) are transmitted on.

A further aspect of the disclosure provide a user equipment for a wireless communications network, configured to: receive a configuration message from a base station for the wireless communications network, the configuration message indicating that data to be transmitted between the user equipment and the wireless communications network is to be duplicated; and, responsive to receipt of the configuration message, transmit a first protocol data unit and a second protocol data unit to the wireless communications network, or receive a first protocol data unit and a second protocol data unit from the wireless communications network. The first protocol data unit comprises one or more service data units. The second protocol data unit comprises duplicates of a subset of the one or more service data units. The second protocol data unit is not a duplicate of the first protocol data unit.

Another aspect of the disclosure provides a first user equipment for a wireless communications network, configured to: receive a configuration message indicating that data to be transmitted between the first user equipment and a second user equipment is to be duplicated; and, responsive to receipt of the configuration message, transmit a first protocol data unit and a second protocol data unit to the second user equipment, or receive a first protocol data unit and a second protocol data unit from the second user equipment. The first protocol data unit comprises one or more service data units, and the second protocol data unit comprises duplicates of a subset of the one or more service data units. The second protocol data unit is not a duplicate of the first protocol data unit.

A further aspect of the disclosure provides a base station for a wireless communications network, configured to: transmit a configuration message to a user equipment for the wireless communications network, the configuration message indicating that data to be transmitted between the user equipment and the wireless communications network is to be duplicated; and, responsive to receipt of the configuration message, transmit a first protocol data unit and a second protocol data unit to the user equipment, or receive a first protocol data unit and a second protocol data unit from the user equipment. The first protocol data unit comprises one or more service data units, and the second protocol data unit comprises duplicates of a subset of the one or more service data units. The second protocol data unit is not a duplicate of the first protocol data unit.

Note that the discussion below focuses on a technical solution for LTE and the developments thereto that are intended to meet the criteria for 5G networks; however, those skilled in the art will appreciate that it is also possible to apply the methods and apparatus described herein to other networks and access technologies.

DETAILED DESCRIPTION

Figure 1:
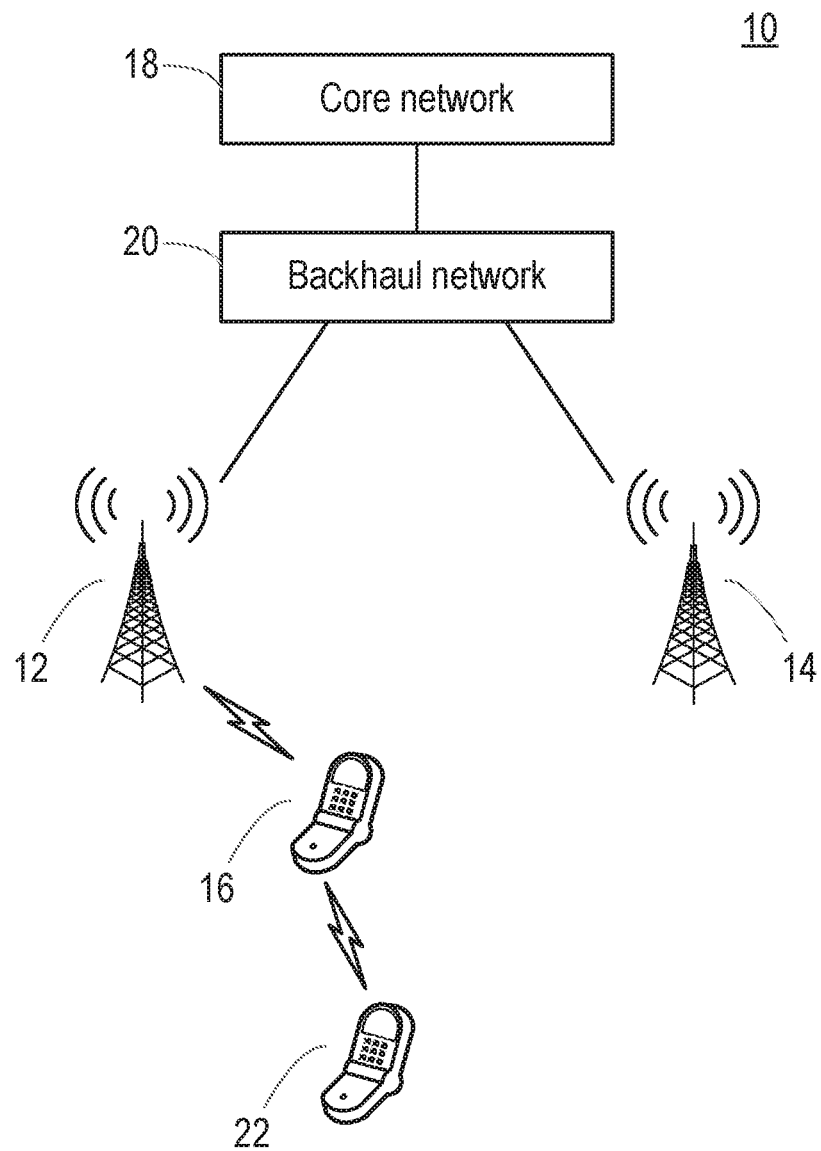
FIG. 1 shows a wireless communications network.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless terminal, or user equipment (UE), it should be understood by the skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode, As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

The description involves communication between a UE and a radio access network, which typically includes multiple radio access nodes. In the specific example given, the radio access nodes take the form of eNodeBs (eNBs), as defined by 3GPP, or gNodeBs (gNBs) as utilised in the future standards expected to meet the 5G requirements.

However, it will be appreciated that the concepts described herein may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

FIG. 1 shows a network 10 that may be utilized to explain the principles of embodiments of the present disclosure. The network 10 comprises first and second radio access nodes 12, 14 which are connected, via a backhaul network 20, to a core network 18.

The radio access nodes 12, 14 may be referred to as e.g. base stations, NodeBs, evolved NodeBs (eNB, or eNodeB), gNodeBs, base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

A wireless terminal 16 (also referred to as a wireless device, or UE) is in wireless communication with the radio access node 12. For example, the wireless terminal 16 may be camped on a cell which the radio access node 12 serves. Messages transmitted by the wireless terminal 16 to the radio access node 12 are said to be transmitted in the "uplink", while messages transmitted by the radio access node 12 to the wireless terminal 16 are said to be transmitted in the "downlink".

Although not explicitly shown in FIG. 1, the wireless terminal 16 may also be able to communicate wirelessly with the second radio access node 14. For example, the wireless terminal 16 may be configured with dual connectivity, whereby one or more radio bearers are established between the terminal 16 and each of the first and second radio access nodes 12, 14, or whereby one or more radio bearers are split between the first and second radio access nodes 12, 14 (or a combination of both).

Also shown in FIG. 1 is a second wireless terminal 22. The second wireless terminal 22 may be in communication with a radio access node (whether one or both of the radio access nodes 12, 14, or another radio access node not illustrated). However, for present purposes it can be seen that the second wireless terminal 22 is in direct communication with the first wireless terminal 16. Thus the first wireless terminal 16 may also be capable of establishing a direct device-to-device (D2D) communication link with a second wireless terminal 22. Messages transmitted over such a link may be referred to as "sidelink" messages.

Figure 2:
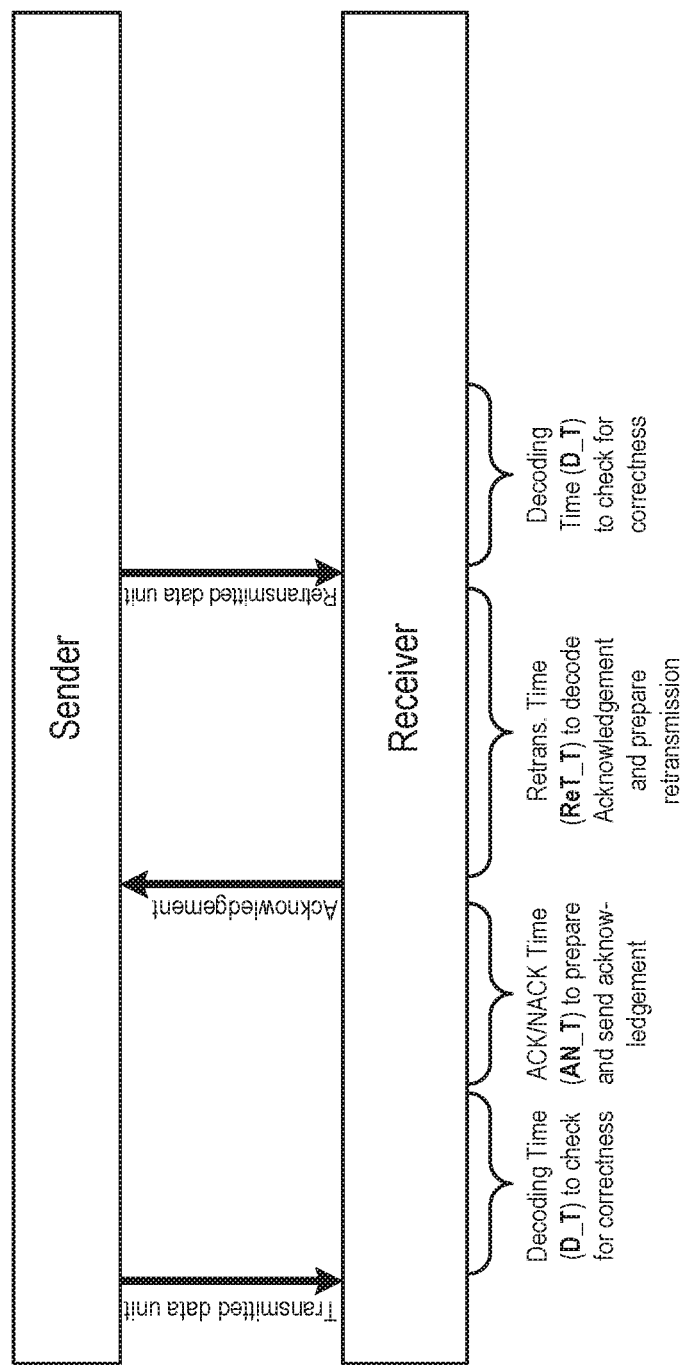
FIG. 2 is a signalling diagram showing a conventional ARQ process between a sender and a receiver.

FIG. 2 is a signalling diagram showing a conventional automatic repeat request (ARQ) process between a sender and a receiver. It will be apparent to those skilled in the art that the "sender" and the "receiver" may be any of the radio access nodes 12, 14 or the wireless terminals 16, 22 shown in FIG. 1. Thus the data unit transmitted by the sender may be transmitted in the uplink, downlink or sidelink.

Initially, the sender transmits a data unit to the receiver, which receives it. Upon reception of the data unit, the receiver must spend a finite time (D_T) decoding the data unit to check whether the data unit has been received correctly. For example, the data unit may comprise redundant bits added to the data using an error-detecting code such as a cyclic redundancy check. Alternatively, the data may be encoded with a forward error correction code. In either case, the receiver is able to determine the presence of errors in the received data unit, and may also be able to determine whether those errors can be corrected.

Once the data unit has been decoded, the receiver prepares an acknowledgement message to be transmitted to the sender. If the data unit is correctly received, a positive acknowledgement (ACK) may be prepared; if the data unit is not correctly received (and cannot be corrected), a negative acknowledgement (NACK) may be prepared. Again, the preparation and transmission of the acknowledgement message takes a finite amount of time (AN_T).

Upon receipt of the acknowledgement message, the sender decodes the message and determines whether the acknowledgement is positive or negative. In the illustrated example, we assume that the data unit was not correctly received and thus the acknowledgement message is negative. In addition to decoding the acknowledgement message, therefore, the sender must prepare a retransmission of the original data unit. A further time period (ReT_T) is thus required to decode the acknowledgement message and prepare the retransmission to the receiver. The receiver must then spend further time (D_T) decoding the retransmission and checking that it was correctly received.

Thus the additional latency (i.e. the additional time before the data contained within the transmitted data unit can be used by the receiver) due to one NACK is AN_T+ReT_T+D_T. Of course, it is possible that the retransmission may itself be incorrectly received and one or more further retransmissions be required, adding further latency to the interaction.

Figure 3:
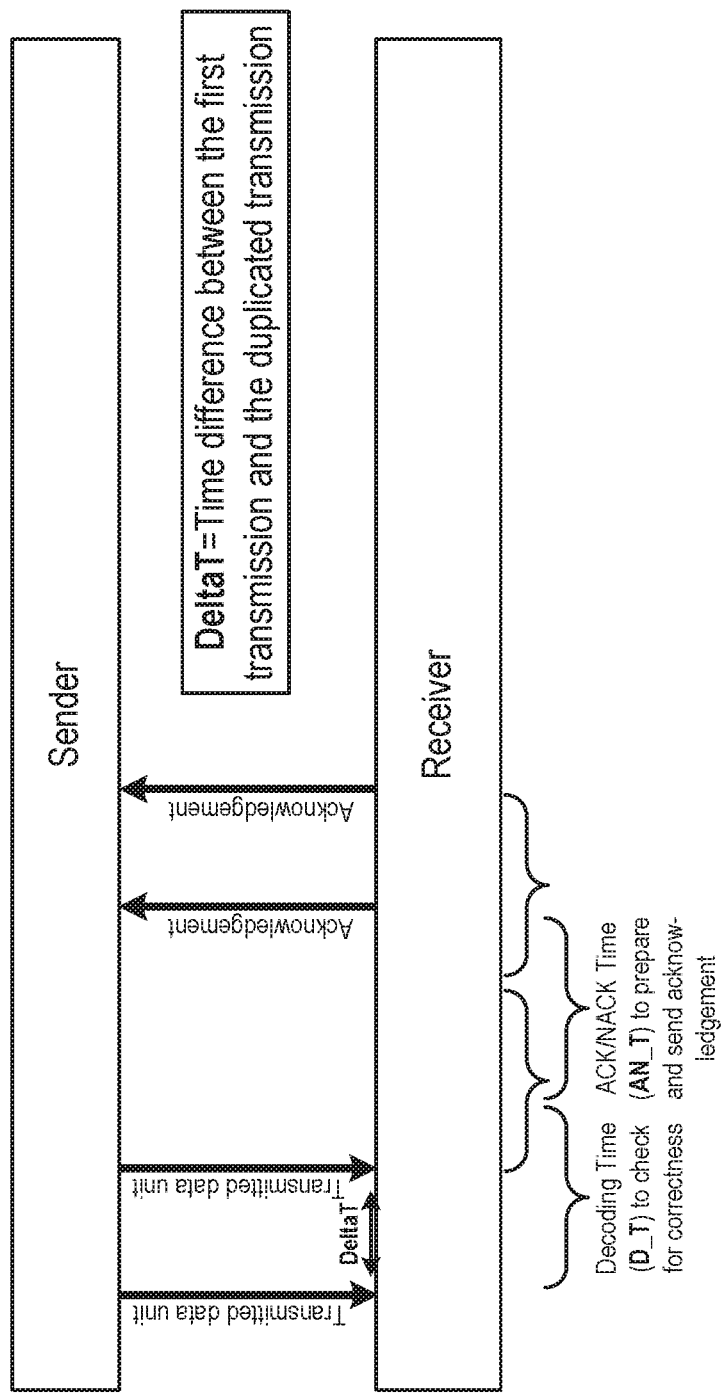
FIG. 3 is a signalling diagram showing signalling according to embodiments of the disclosure.

FIG. 3 is a signalling diagram showing an ARQ process according to embodiments of the disclosure. Again, the process is illustrated between a "sender" and a "receiver". It will be understood that the sender may be any of radio access nodes 12, 14 or wireless terminals 16, 22, and that the receiver may likewise be any of radio access nodes 12, 14 or wireless terminals 16, 22. The data unit may be transmitted in uplink, downlink or sidelink.

According to embodiments of the disclosure, data units to be transmitted by the sender are duplicated and transmitted using different radio resources, i.e. regardless of whether the initial data unit is correctly received by the receiver or not.

Thus in FIG. 3 the sender prepares and transmits a first data unit to the receiver. Upon receipt, the receiver begins decoding the first data unit to determine whether it was correctly received or not. A short time (DeltaT) later, the sender transmits a second data unit, which is a duplicate of the first data unit, to the receiver using different radio resources. Upon receipt, the receiver begins decoding the second data unit to determine whether it was correctly received or not. Thus the receiver decodes the first and second data units in parallel, i.e. the decoding time for the first data unit overlaps (partially or—in other embodiments—totally) the decoding time for the second data unit. Once the data units have been decoded, appropriate acknowledgement messages can be prepared by the receiver and transmitted to the sender.

In the event that the first data unit is not correctly received, but the second data unit is correctly received, it will be apparent that the signalling shown in FIG. 3 leads to additional latency equal to DeltaT, i.e. the time between transmission of the first and second data units. In some embodiments, the first and second data units may be transmitted simultaneously (but using different frequencies, for example), such that DeltaT is equal to zero. However, in general DeltaT may be chosen to be a value that is smaller than the additional latency required by the signalling diagram of FIG. 2 (i.e. AN_T+ReT_T+D_T). That is, the second data unit is transmitted within a time window of the first data unit that is shorter than the latency that would be added by a retransmission under the conventional ARQ scheme. Therefore latency is reduced by the transmission of duplicate data units.

The radio resources used for transmission of the second data unit may differ from the radio resources used for transmission of the first data unit in a number of different ways. For example, the first data unit may be transmitted via resources for one cell (e.g. one served by the first radio access node 12), whereas the second data unit may be transmitted via resources for a different cell (e.g. one served by the second radio access node 14). This aspect may be appropriate for duplicating communications between the network 10 and a wireless terminal 16 configured in dual connectivity, for example.

The radio access nodes 12, 14 may support a plurality of directional beams within the cells served by those radio access nodes. The directional beams may comprise an individual identity that allows them to be identified. In such embodiments, the first data unit may be transmitted via a first beam, or subset of one or more beams, whereas the second data unit may be transmitted via a second beam, or subset of one or more beams.

In another example, a plurality of carriers may be established between the sending device and the receiving device using different carrier frequency bands. The first data unit may be transmitted over a first carrier, whereas the second data unit may be transmitted over a second carrier.

In a further example, a plurality of radio bearers may be established between the sending device and the receiving device. The first data unit may be transmitted over a first bearer, whereas the second data unit may be transmitted over a second bearer.

In further examples, the first data unit may be transmitted using a first frequency whereas the second data unit may be transmitted using a second, different frequency. The first data unit may be encoded using a first transmission code, whereas the second data unit may be encoded using a second, different transmission code that is orthogonal to the first transmission code. The first data unit may be transmitted using first time resources (or a first set of time resources), whereas the second data unit may be transmitted using second, different time resources (or a second set of time resources). In this example, it should be noted that different time resources means different time slots in a repeated time structure. Thus, a first time slot in a first frame, for example, is considered to be the same time resource as a second time slot that has the same temporal position as the first time slot within a second frame.

It will be appreciated that, although the description above mentions only first and second data units (with the second data unit being a duplicate of the first), the schemes described may be extended to more than one duplicate (i.e. third, fourth, fifth data units, etc).

FIG. 3 shows how methods according to embodiments of the disclosure reduce latency in the transmission of data units between a sending device and a receiving device. However, it will be appreciated that the methods described herein also achieve high levels of reliability in the transmission of data through the transmission of duplicate data units.

Figure 4:
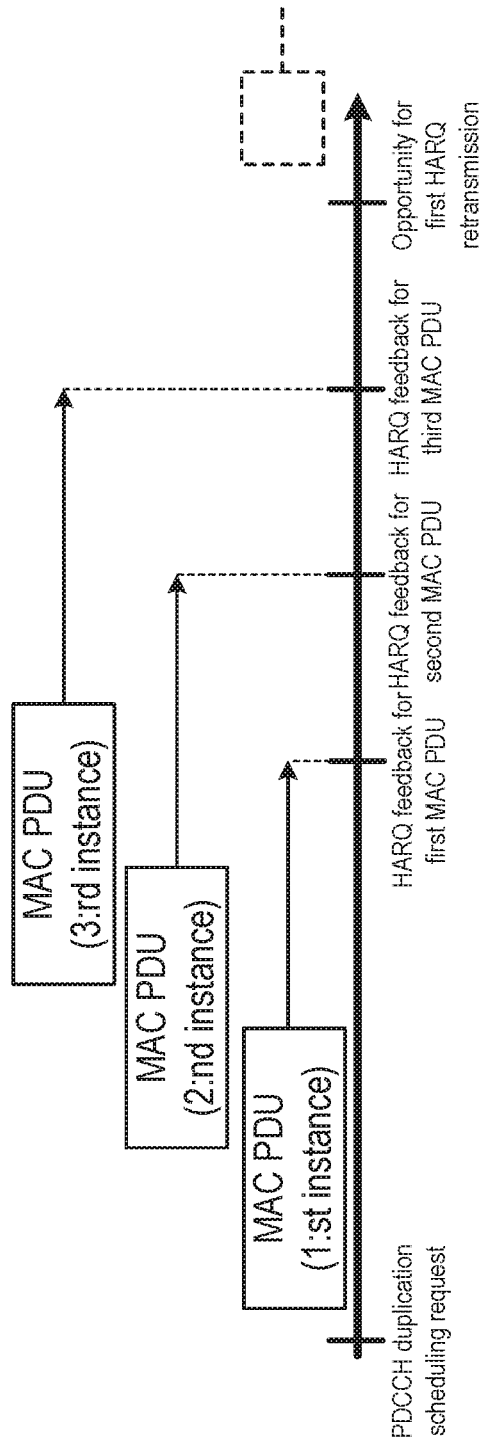
FIG. 4 is a further signalling diagram showing signalling according to embodiments of the disclosure.

FIG. 4 shows a time line of a method according to further embodiments of the disclosure.

Initially, a request is made for duplication of data units. Further detail will be provided below regarding this aspect. However, in the illustrated embodiment the duplication request is received by a wireless terminal (such as the wireless terminal 16) and transmitted from the network (such as the radio access node 12). The request may be transmitted over a physical control channel, such as the physical downlink control channel (PDCCH) or equivalents thereof.

Responsive to receipt of the scheduling request, the wireless terminal transmits a first data unit, which in this case is a MAC PDU. The transmission takes a finite period of time, illustrated in FIG. 4 as a width in the horizontal direction. A time slot is scheduled for the transmission of an acknowledgement message for the first data unit (i.e. HARQ feedback). Prior to that time slot, the wireless terminal transmits a second data unit, which is a duplicate of the first, using different radio resources as defined above. In the illustrated example, transmission of the second data unit occurs after, but overlaps with transmission of the first data unit. It will be appreciated, however, that in other embodiments the transmissions may overlap entirely (i.e. the transmissions occur simultaneously), or not overlap at all. Transmission of a third data unit is also illustrated, delayed in a similar manner to the second data unit.

The receiving device (in this case, the radio access node) may keep track each of the duplicated data units. If it happens that all copies of the transmitted data unit fail (i.e. none is received successfully), the legacy method of retransmission can then be used to ensure that eventually the data unit will be successfully transferred. That is, negative acknowledgement messages may be transmitted in respect of each of the data units, and retransmissions of one or more, or all, of the data units can take place via the conventional process. However, as multiple copies of the data unit are transmitted using different radio resources, it is likely that at least one of the data units will be received successfully. Upon successful decoding of at least one of the data units, the successful result can be passed to higher layers and retransmissions not scheduled.

Figure 5:
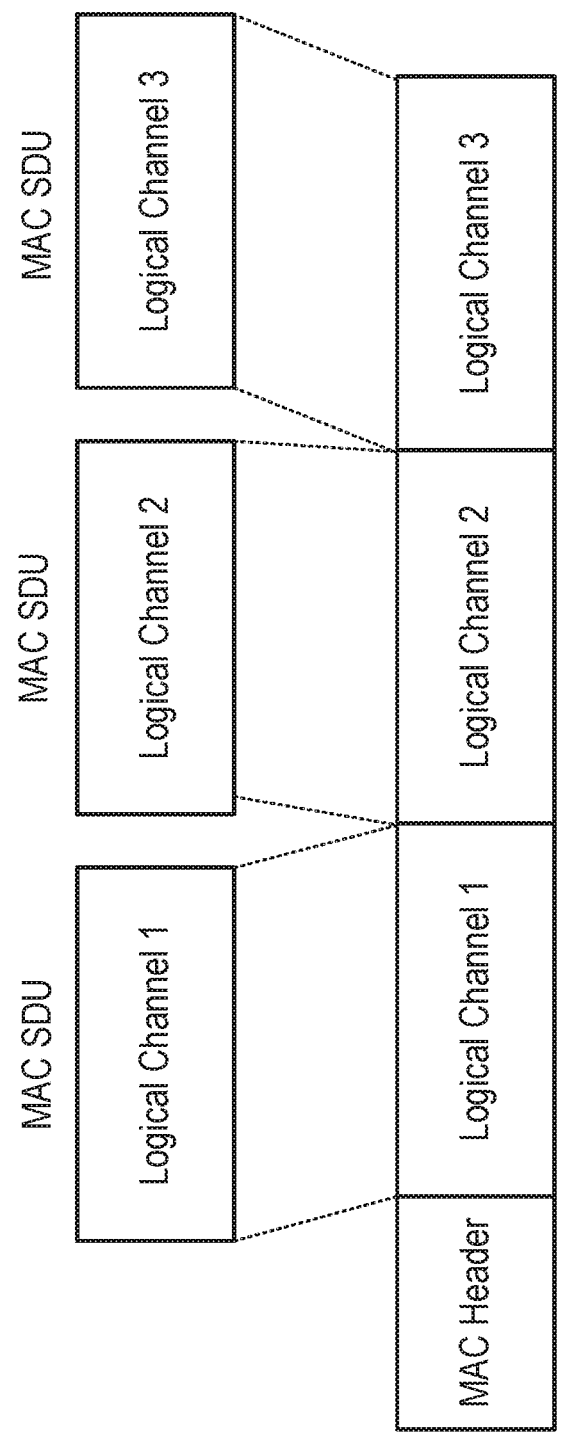
FIG. 5 is a schematic diagram showing the structure of a MAC PDU.

It will be noted that in the example of FIG. 4, the data units are MAC PDUs. FIG. 5 shows the structure of a MAC PDU in more detail.

It is the MAC protocol that is responsible for creating the MAC PDUs that are transmitted over the radio interface using specific radio resources. A MAC PDU is transferred using one transport block (TB) and usually these two terms can be used interchangeably.

Each MAC PDU comprises one or more MAC SDUs. One MAC SDU can comprise data from one logical channel and may for instance comprise one RLC PDU. These MAC SDUs are combined, together with a MAC header, to form a MAC PDU.

Figure 6:
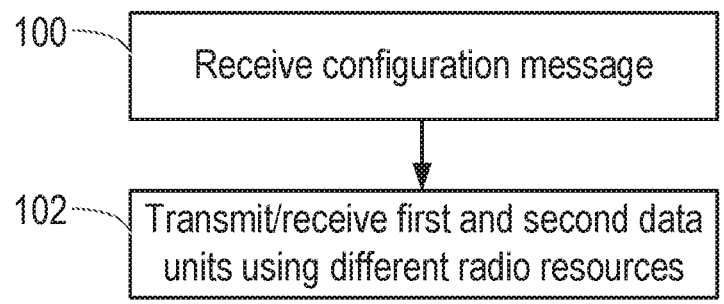
FIG. 6 is a flowchart of a method according to embodiments of the disclosure.

FIG. 6 is a flowchart of a method according to embodiments of the disclosure. The method may be carried out in a wireless terminal, for example, such as the wireless terminal 16.

In step 100, the wireless terminal receives a configuration message indicating that data units to be transmitted between the wireless terminal and the network are to be duplicated. The configuration message may be transmitted by a network device, such as a radio access node (e.g. in the event of uplink/downlink communications), or by another wireless terminal (e.g. in the event of sidelink communications).

For example, the configuration message may be transmitted over a physical control channel, such as the physical downlink control channel (or equivalents thereof). For example, the configuration message may comprise a particular downlink control information (DCI) format indicating the duplication of data.

The configuration message may relate to a particular data unit, such that separate configuration messages are received for each data unit that is to be duplicated, or the configuration message may relate to multiple data units, each of which is to be duplicated. For example, in the latter case the configuration message may define a particular time period during which data units are to be duplicated. The configuration message may define one or more classes of traffic for which data units are to be duplicated. For example, URLLC traffic may be defined as requiring duplication of data units. The configuration message may comprise an indication of a logical channel for which data units are to be duplicated. The configuration message may comprise indications for a plurality of logical channels as to whether data units for those logical channels are to be duplicated.

The configuration message may comprise an indication of the radio resources to be used for each of the duplicated transmissions. Alternatively, the resources to be used may have been pre-configured by higher layers, with the configuration message merely indicating that duplication is required. The configuration message may comprise an indication of the transport format to be used for each of the duplicate data units.

In some embodiments, the configuration message may comprise an indication of the radio resources and/or transport format for the expected HARQ feedback for the duplicated data transmission. The configuration message may comprise one or more parameters relating to power control on the transmission of duplicate data units. For example, if there is insufficient available transmit power for simultaneous transmission of duplicate data units, the configuration message may contain an indication of which data unit is to be prioritized, or a set of rules with which the wireless terminal can determine which data unit to transmit in preference to the other data units.

In step 102, after reception of the configuration message, the wireless terminal transmits or receives a first data unit, using first radio resources, and a second data unit (which is a duplicate of the first data unit), using second radio resources. The second radio resources are different from the first radio resources.

The radio resources may differ in any of the ways listed above. That is, the first and second data units may be transmitted via different cells, or different portions of cells (e.g. different subset of beams). The first and second data units may be transmitted using different time, code, or frequency resources. The first and second data units may be transmitted using different radio bearers, or different carriers. Of course, those skilled in the art will appreciate that these embodiments may be combined in any combination, such that the first and second data units may be transmitted via different cells and different frequencies, for example, or different beams and different orthogonal codes.

The first and second data units may be transmitted simultaneously, or within a time window of each other, i.e. the second data unit may be transmitted within a time window of the first data unit. The time window may be defined to be very short (e.g. a maximum number of transmission time intervals, TTIs), such that any delay between transmission of the first and second data units is less than the latency that would otherwise be incurred by transmission of a NACK message and retransmission of the data unit using conventional methods.

In one embodiment, the data units are MAC data units. For example, the data units may be MAC PDUs. In another example, the data units may be MAC SDUs. The MAC SDUs configured for duplicated transmission may have priority to be included in MAC PDUs transmitted as duplicates (as specified in the previous embodiment). Alternatively, MAC SDUs configured for duplicated transmission may be sent as duplicates in different MAC PDUs scheduled at a specific TTI (i.e. simultaneously) or within a certain number of TTIs (e.g. in consecutive TTIs). These different MAC PDUs may be duplicates of each other or not. In the latter case (i.e. where duplicated MAC SDUs are included within MAC PDUs that are not duplicates), the MAC PDUs may be transmitted using the same radio resources. In a further embodiment, the MAC SDUs configured for duplication may be transmitted as duplicates within the same MAC PDU.

In one embodiment, therefore, step 102 comprises the substeps of: determining the presence of data to be transmitted; determining an identity of a logical channel to which the data belongs; determining whether the logical channel is configured for duplication (i.e. based on the configuration message); and responsive to a determination that the logical channel is configured for duplication, generating and transmitting the first and second data units, each comprising the data to be transmitted.

Figure 7:
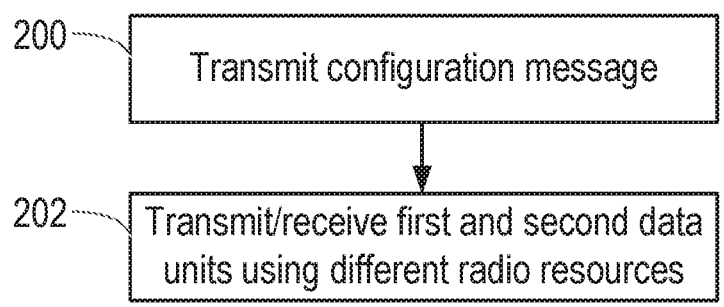
FIG. 7 is a flowchart of a method according to further embodiments of the disclosure.

FIG. 7 is a flowchart of a method according to embodiments of the disclosure. The method may be carried out in a network device of a wireless communications network, for example, such as the radio access node 12.

In step 200, the network device transmits a configuration message to a wireless terminal indicating that data units to be transmitted between the wireless terminal and the network are to be duplicated.

For example, the configuration message may be transmitted over a physical control channel, such as the physical downlink control channel (or equivalents thereof). For example, the configuration message may comprise a particular downlink control information (DCI) format indicating the duplication of data.

The configuration message may relate to a particular data unit, such that separate configuration messages are received for each data unit that is to be duplicated, or the configuration message may relate to multiple data units, each of which is to be duplicated. For example, in the latter case the configuration message may define a particular time period during which data units are to be duplicated. The configuration message may define one or more classes of traffic for which data units are to be duplicated. For example, URLLC traffic may be defined as requiring duplication of data units. The configuration message may comprise an indication of a logical channel for which data units are to be duplicated. The configuration message may comprise indications for a plurality of logical channels as to whether data units for those logical channels are to be duplicated.

The configuration message may comprise an indication of the radio resources to be used for each of the duplicated transmissions. Alternatively, the resources to be used may have been pre-configured by higher layers, with the configuration message merely indicating that duplication is required. The configuration message may comprise an indication of the transport format to be used for each of the duplicate data units.

In some embodiments, the configuration message may comprise an indication of the radio resources and/or transport format for the expected HARQ feedback for the duplicated data transmission. The configuration message may comprise one or more parameters relating to power control on the transmission of duplicate data units. For example, if there is insufficient available transmit power for simultaneous transmission of duplicate data units, the configuration message may contain an indication of which data unit is to be prioritized, or a set of rules with which the wireless terminal can determine which data unit to transmit in preference to the other data units.

In step 202, after transmission of the configuration message, the network device transmits or receives a first data unit, using first radio resources, and a second data unit (which is a duplicate of the first data unit), using second radio resources. The second radio resources are different from the first radio resources.

The radio resources may differ in any of the ways listed above. That is, the first and second data units may be transmitted via different cells, or different portions of cells (e.g. different subset of beams). The first and second data units may be transmitted using different time, code, or frequency resources. The first and second data units may be transmitted using different radio bearers, or different carriers. Of course, those skilled in the art will appreciate that these embodiments may be combined in any combination, such that the first and second data units may be transmitted via different cells and different frequencies, for example, or different beams and different orthogonal codes.

The first and second data units may be transmitted simultaneously, or within a time window of each other, i.e. the second data unit may be transmitted within a time window of the transmission of the first data unit. The time window may be defined to be very short (e.g. a maximum number of transmission time intervals, TTIs), such that any delay between transmission of the first and second data units is less than the latency that would otherwise be incurred by transmission of a NACK message and retransmission of the data unit using conventional methods.

In one embodiment, the data units are MAC data units. For example, the data units may be MAC PDUs. In another example, the data units may be MAC SDUs. The MAC SDUs configured for duplicated transmission may have priority to be included in MAC PDUs transmitted as duplicates (as specified in the previous embodiment). Alternatively, MAC SDUs configured for duplicated transmission may be sent as duplicates in different MAC PDUs scheduled at a specific TTI (i.e. simultaneously) or within a certain number of TTIs (e.g. in consecutive TTIs). These different MAC PDUs may be duplicates of each other or not. In the latter case (i.e. where duplicated MAC SDUs are included within MAC PDUs that are not duplicates), the MAC PDUs may be transmitted using the same radio resources. In a further embodiment, the MAC SDUs configured for duplication may be transmitted as duplicates within the same MAC PDU.

In one embodiment, therefore, step 202 comprises the substeps of: determining the presence of data to be transmitted to the wireless terminal; determining an identity of a logical channel to which the data belongs; determining whether the logical channel is configured for duplication (i.e. based on the configuration message); and responsive to a determination that the logical channel is configured for duplication, generating and transmitting the first and second data units, each comprising the data to be transmitted.

Figure 8:
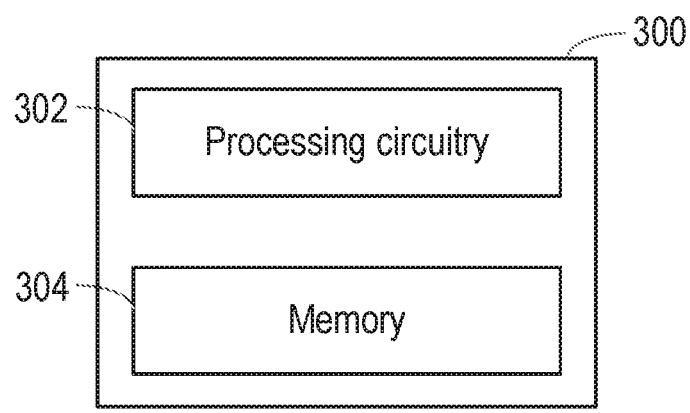
FIG. 8 is a schematic diagram of a wireless device according to embodiments of the disclosure.

FIG. 8 is a schematic drawing of a wireless terminal 300 according to embodiments of the disclosure. The wireless terminal 300 may be suitable for carrying out the method described above, and particularly with respect to FIG. 6, for example.

The terminal 300 comprises processing circuitry 302 and a non-transitory computer-readable medium 304 (such as memory) communicatively coupled to the processing circuitry 302.

In one embodiment, the medium 304 stores instructions which, when executed by the processing circuitry 302, cause the terminal 300 to: receive a configuration message from a network device for the wireless communications network, the configuration message indicating that data to be transmitted between the wireless device and the wireless communications network is to be duplicated; and, responsive to receipt of the configuration message, transmit a first data unit and a second data unit to the wireless communications network, or receive a first data unit and a second data unit from the wireless communications network. The second data unit is a duplicate of the first data unit, and the first data unit is transmitted or received using first radio resources, and the second data unit is transmitted using second radio resources that are different than the first radio resources.

In another embodiment, the medium 304 stores instructions which, when executed by the processing circuitry 302, cause the terminal 300 to: receive a configuration message, the configuration message indicating that data to be transmitted between the first wireless device and a second wireless device over a direct communication link is to be duplicated; and responsive to receipt of the configuration message, transmit a first data unit and a second data unit to the second wireless device, or receiving a first data unit and a second data unit from the second wireless device. The second data unit is a duplicate of the first data unit, and the first data unit is transmitted or received using first radio resources, and the second data unit is transmitted using second radio resources that are different than the first radio resources.

In a further embodiment, the medium 304 stores instructions which, when executed by the processing circuitry 302, cause the terminal 300 to: receive a configuration message from a network device for the wireless communications network, the configuration message indicating that data to be transmitted between the wireless device and the wireless communications network is to be duplicated; and, responsive to receipt of the configuration message, transmit a first protocol data unit and a second protocol data unit to the wireless communications network, or receive a first protocol data unit and a second protocol data unit from the wireless communications network. The first protocol data unit comprises one or more service data units, and the second protocol data unit comprises duplicates of a subset of the one or more service data units. The second protocol data unit is not a duplicate of the first protocol data unit.

In another embodiment, the medium 304 stores instructions which, when executed by the processing circuitry 302, cause the terminal 300 to: receive a configuration message indicating that data to be transmitted between the first wireless device and a second wireless device is to be duplicated; and responsive to receipt of the configuration message, transmit a first protocol data unit and a second protocol data unit to the second wireless device, or receive a first protocol data unit and a second protocol data unit from the second wireless device. The first protocol data unit comprises one or more service data units. The second protocol data unit comprises duplicates of a subset of the one or more service data units. The second protocol data unit is not a duplicate of the first protocol data unit.

In further embodiments, the terminal 300 may comprise hardware for transmitting wireless signals (not illustrated), e.g. one or more antennas, and corresponding transceiver circuitry, coupled to the processing circuitry 302 and/or the memory 304

Figure 9:
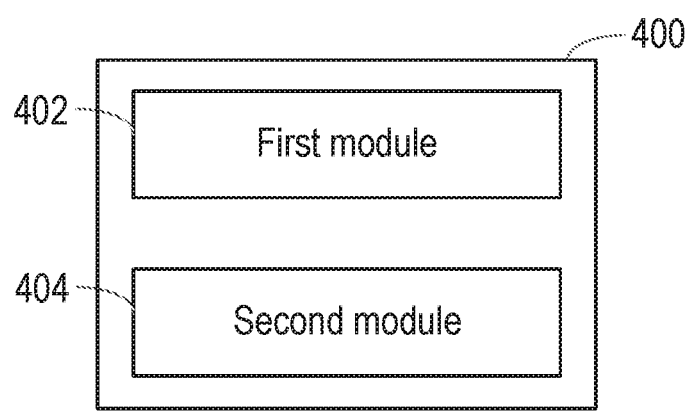
FIG. 9 is a schematic diagram of a wireless device according to further embodiments of the disclosure.

FIG. 9 is a schematic drawing of a wireless terminal 400 according to embodiments of the disclosure. The wireless terminal 400 may be suitable for carrying out the method described above, and particularly with respect to FIG. 6, for example.

The terminal 400 comprises a first module 402 and a second module 404.

In one embodiment, the first module 402 is configured to receive a configuration message from a network device for the wireless communications network, the configuration message indicating that data to be transmitted between the wireless device and the wireless communications network is to be duplicated. The second module 404 is configured to, responsive to receipt of the configuration message, transmit a first data unit and a second data unit to the wireless communications network, or receive a first data unit and a second data unit from the wireless communications network. The second data unit is a duplicate of the first data unit. The first data unit is transmitted or received using first radio resources, and the second data unit is transmitted using second radio resources that are different than the first radio resources.

In another embodiment, the first module 402 is configured to receive a configuration message, the configuration message indicating that data to be transmitted between the first wireless device and a second wireless device over a direct communication link is to be duplicated. The second module 404 is configured to, responsive to receipt of the configuration message, transmit a first data unit and a second data unit to the second wireless device, or receiving a first data unit and a second data unit from the second wireless device. The second data unit is a duplicate of the first data unit. The first data unit is transmitted or received using first radio resources, and the second data unit is transmitted using second radio resources that are different than the first radio resources.

In a further embodiment, the first module 402 is configured to receive a configuration message from a network device for the wireless communications network, the configuration message indicating that data to be transmitted between the wireless device and the wireless communications network is to be duplicated. The second module 404 is configured to, responsive to receipt of the configuration message, transmit a first protocol data unit and a second protocol data unit to the wireless communications network, or receive a first protocol data unit and a second protocol data unit from the wireless communications network. The first protocol data unit comprises one or more service data units, and the second protocol data unit comprises duplicates of a subset of the one or more service data units. The second protocol data unit is not a duplicate of the first protocol data unit.

In a yet further embodiment, the first module 402 is configured to receive a configuration message indicating that data to be transmitted between the first wireless device and a second wireless device is to be duplicated. The second module 404 is configured to, responsive to receipt of the configuration message, transmit a first protocol data unit and a second protocol data unit to the second wireless device, or receive a first protocol data unit and a second protocol data unit from the second wireless device. The first protocol data unit comprises one or more service data units, and wherein the second protocol data unit comprises duplicates of a subset of the one or more service data units. The second protocol data unit is not a duplicate of the first protocol data unit.

Figure 10:
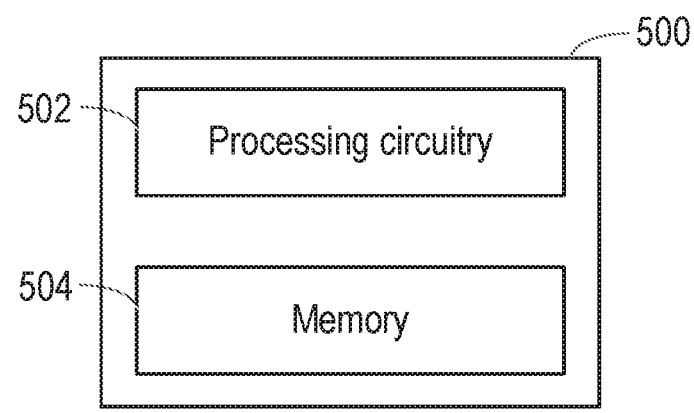
FIG. 10 is a schematic diagram of a network node according to embodiments of the disclosure.

FIG. 10 is a schematic drawing of a network device (or node) 500 according to embodiments of the disclosure. The network device 500 may be suitable for carrying out the method described above, and particularly with respect to FIG. 7, for example.

The network device 500 comprises processing circuitry 502 and a non-transitory computer-readable medium 504 (such as memory) communicatively coupled to the processing circuitry 502.

In one embodiment, the medium 504 stores instructions which, when executed by the processing circuitry 502, cause the network device 500 to: transmit a configuration message to a wireless device, the configuration message indicating that data to be transmitted between the wireless device and the wireless communications network is to be duplicated; and responsive to transmission of the configuration message, transmit a first data unit and a second data unit to the wireless device, or receive a first data unit and a second data unit from the wireless device. The second data unit is a duplicate of the first data unit, and the first data unit is transmitted or received using first radio resources, and the second data unit is transmitted using second radio resources that are different than the first radio resources.

In another embodiment, the medium 504 stores instructions which, when executed by the processing circuitry 502, cause the network device 500 to: transmit a configuration message to a wireless device for the wireless communications network, the configuration message indicating that data to be transmitted between the wireless device and the wireless communications network is to be duplicated; and, responsive to receipt of the configuration message, transmit a first protocol data unit and a second protocol data unit to the wireless device, or receive a first protocol data unit and a second protocol data unit from the wireless device. The first protocol data unit comprises one or more service data units, and the second protocol data unit comprises duplicates of a subset of the one or more service data units. The second protocol data unit is not a duplicate of the first protocol data unit.

In further embodiments, the network device 500 may comprise hardware for transmitting wireless signals (not illustrated), e.g. one or more antennas, and corresponding transceiver circuitry, coupled to the processing circuitry 502 and/or the memory 504.

Figure 11:
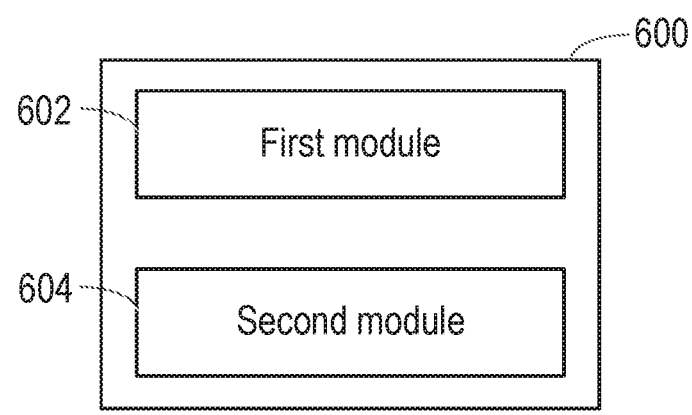
FIG. 11 is a schematic diagram of a network node according to further embodiments of the disclosure.

FIG. 11 is a schematic drawing of a network device 600 according to embodiments of the disclosure. The network device 600 may be suitable for carrying out the method described above, and particularly with respect to FIG. 7, for example.

The network device 600 comprises a first module 602 and a second module 604.

In one embodiment, the first module 602 is configured to transmit a configuration message to a wireless device, the configuration message indicating that data to be transmitted between the wireless device and the wireless communications network is to be duplicated. The second module 604 is configured to, responsive to transmission of the configuration message, transmit a first data unit and a second data unit to the wireless device, or receive a first data unit and a second data unit from the wireless device. The second data unit is a duplicate of the first data unit. The first data unit is transmitted or received using first radio resources, and the second data unit is transmitted using second radio resources that are different than the first radio resources.

In another embodiment, the first module 602 is configured to transmit a configuration message to a wireless device for the wireless communications network, the configuration message indicating that data to be transmitted between the wireless device and the wireless communications network is to be duplicated. The second module 604 is configured to, responsive to receipt of the configuration message, transmit a first protocol data unit and a second protocol data unit to the wireless device, or receive a first protocol data unit and a second protocol data unit from the wireless device. The first protocol data unit comprises one or more service data units, and the second protocol data unit comprises duplicates of a subset of the one or more service data units. The second protocol data unit is not a duplicate of the first protocol data unit.

Although the text above has described embodiments of the disclosure in the context of the 3GPP specifications, specifically Long Term Evolution and developments thereto, those skilled in the art will appreciate that the methods, apparatus and concepts described herein may equally apply to other radio access technologies and the networks that employ them.

The invention claimed is:

1. A method in a user equipment for a wireless communications network, comprising:
receiving a configuration message from a base station for the wireless communications network, the configuration message indicating that, for at least one logical channel, data to be transmitted between the user equipment and the wireless communications network is to be duplicated; and
responsive to determining the presence of data to be transmitted for the wireless communications network:
determining an identity of a logical channel to which the data belongs;
determining, based on the configuration message, that the logical channel is configured for duplication;
responsive to the determination that the logical channel is configured for duplication, generating first and second data units, each comprising the data to be transmitted; and
transmitting the first data unit using first radio resources and transmitting the second data unit using second radio resources.

2. The method according to claim 1, wherein the first radio resources comprise a first carrier and the second radio resources comprise a second carrier.

3. The method according to claim 2, wherein the first carrier and the second carrier are established between the user equipment and a first base station.

4. The method according to claim 2, wherein the first carrier is established between the user equipment and a first base station, and the second carrier is established between the user equipment and a second base station.

5. The method according to claim 1, wherein the configuration message comprises an indication that data belonging to the logical channel is to be duplicated.

6. The method according to claim 1, wherein the configuration message comprises an indication of the first and second radio resources to be used for transmission of the first and second data units.

7. The method according to claim 1, wherein the first and second data units comprise first and second protocol data units (PDUs).

8. The method according to claim 1, wherein the first and second data units comprise first and second service data units (SDUs) comprised within different protocol data units (PDUs).

9. A method in a first user equipment for a wireless communications network, comprising:
receiving a configuration message, the configuration message indicating that, for at least one logical channel, data to be transmitted between the first user equipment and a second user equipment over a direct communication link is to be duplicated; and
responsive to determining the presence of data to be transmitted for the second user equipment:
determining an identity of a logical channel to which the data belongs;
determining, based on the configuration message, that the logical channel is configured for duplication;
responsive to the determination that the logical channel is configured for duplication, generating first and second data units, each comprising the data to be transmitted; and
transmitting the first data unit using first radio resources and transmitting the second data unit using second radio resources.

10. The method according to claim 9, wherein the first radio resources comprise a first carrier and the second radio resources comprise a second carrier.

11. A user equipment for a wireless communications network, comprising:
processing circuitry; and
a non-transitory computer-readable medium storing instructions that, when executed by the processing circuitry, cause the user equipment to:
receive a configuration message from a base station for the wireless communications network, the configuration message indicating that, for at least one logical channel, data to be transmitted between the user equipment and the wireless communications network is to be duplicated; and
responsive to determining the presence of data to be transmitted for the wireless communications network:
determine an identity of a logical channel to which the data belongs;
determine, based on the configuration message, that the logical channel is configured for duplication;
responsive to the determination that the logical channel is configured for duplication, generate first and second data units, each comprising the data to be transmitted; and
transmit the first data unit using first radio resources and transmit the second data unit using second radio resources.

12. The user equipment according to claim 11, wherein the first radio resources comprise a first carrier and the second radio resources comprise a second carrier.

13. The user equipment according to claim 12, wherein the first carrier and the second carrier are established between the user equipment and a first base station.

14. The user equipment according to claim 12, wherein the first carrier is established between the user equipment and a first base station, and the second carrier is established between the user equipment and a second base station.

15. The user equipment according to claim 11, wherein one of the first data unit and the second data unit is transmitted to the base station, and the other of the first data unit and the second data unit is transmitted to a second base station.

16. The user equipment according to claim 11, wherein the configuration message comprises an indication that data belonging to the logical channel is to be duplicated.

17. The user equipment according to claim 11, wherein the configuration message comprises an indication of the first and second radio resources to be used for transmission of the first and second data units.

18. The user equipment according to claim 11, wherein the second data unit is transmitted prior to receiving any acknowledgement message from the base station with respect to the first data unit.

19. The user equipment according to claim 11, wherein the first and second data units comprise first and second protocol data units (PDUs).

20. The user equipment according to claim 11, wherein the first and second data units comprise control information.

21. The user equipment according to claim 11, wherein the first and second data units comprise first and second service data units (SDUs) comprised within different protocol data units (PDUs).

22. A base station for a wireless communications network, comprising:
processing circuitry; and
a non-transitory computer-readable medium storing instructions that, when executed by the processing circuitry, cause the base station to:
transmit a configuration message to a user equipment, the configuration message indicating that for at least one logical channel, data to be transmitted between the user equipment and the wireless communications network is to be duplicated; and
responsive to determining the presence of data to be transmitted for the user equipment:
determine an identity of a logical channel to which the data belongs;
determine, in accordance with the configuration message, that the logical channel is configured for duplication;
responsive to the determination that the logical channel is configured for duplication, generate first and second data units, each comprising the data to be transmitted; and
transmit the first data unit using first radio resources and transmit the second data unit using second radio resources.

23. The base station according to claim 22, wherein the first radio resources comprise a first carrier and the second radio resources comprise a second carrier.

24. The base station according to claim 22, wherein, to transmit the first data unit on the first radio resources and to transmit the second data unit on the second radio resources, the base station is configured to transmit the first data unit using one directional beam or one subset of directional beams, and to transmit the second data unit using another directional beam or another subset of directional beams.

25. The base station according to claim 22, wherein the configuration message comprises an indication that data belonging to the logical channel is to be duplicated.

26. The base station according to claim 22, wherein the configuration message comprises an indication of the first and second radio resources to be used for transmission of the first and second data units.

* * * * *